United States Patent [19]
Hatori et al.

[11] Patent Number: 6,047,727
[45] Date of Patent: Apr. 11, 2000

[54] VALVE ASSEMBLY FOR GAS CYLINDER AND PRESSURE REDUCING VALVE USED THEREFOR

[75] Inventors: Teruo Hatori, Amagasaki; Keitaro Yonezawa, Kobe, both of Japan

[73] Assignee: Kabushiki Kaisha Neriki, Hyogo, Japan

[21] Appl. No.: 09/156,620

[22] Filed: Sep. 18, 1998

[30] Foreign Application Priority Data

Sep. 19, 1997 [JP] Japan .................................. 9-254394

[51] Int. Cl.[7] .................................................. F16K 31/12
[52] U.S. Cl. .............................. 137/505.28; 137/505.25
[58] Field of Search .................................. 137/599, 881, 137/886, 544, 878, 861, 505.28, 505.25

[56] References Cited

U.S. PATENT DOCUMENTS

| | | | |
|---|---|---|---|
| 4,354,666 | 10/1982 | McHale | 251/335 |
| 4,499,914 | 2/1985 | Schebler | 137/505.28 |
| 5,309,945 | 5/1994 | Sakai et al. | 137/861 |

FOREIGN PATENT DOCUMENTS

3-219172  9/1991  Japan.

*Primary Examiner*—Henry J. Recla
*Assistant Examiner*—Tuan Nguyen
*Attorney, Agent, or Firm*—Bacon & Thomas, PLLC

[57] ABSTRACT

A stop valve (7) and a pressure reducing valve (8) are arranged in series with each other within a housing (3). A first check valve (11) is arranged in a gas charging passage (10) provided in parallel to the pressure reducing valve (8). The pressure reducing valve (8) is adapted so as to move a piston member (59) for opening and closing by a balance between a spring force for valve opening and a secondary pressure for valve closing. A first coned disc spring (F) urges the piston member (59) toward an opening direction. The first coned disc spring (F) is connected in series with a second coned disc spring (S). The second coned disc spring (S) is compressed by a pushing member (66) projecting from a cap member (61).

3 Claims, 5 Drawing Sheets

VALVE ASSEMBLY FOR GAS CYLINDER AND PRESSURE REDUCING VALVE USED THEREFOR

BACKGROUND OF THE INVENTION

1. Technical Field

The present invention relates to a valve assembly which is attached to a gas cylinder containing compressed gas or liquefied gas for the use of taking out the gas and charging it, and to a pressure reducing valve provided in the valve assembly. More specifically, it relates to a valve assembly adapted so as to be able to take out a high pressure gas contained in a gas cylinder through an outlet bore while being reduced by the pressure reducing valve at the time of gas taking-out and charge the high pressure gas into the gas cylinder through the outlet bore at the time of gas charging.

2. Description of the Earlier Technology

A pressure reducing valve provided in a gas cylinder valve assembly of this kind has a piston member inserted into a pressure reducing valve chamber within a housing, the piston member being adapted so as to move for opening and closing by a balance between a spring force for valve opening and a secondary (valve-outlet) pressure for valve closing.

By the way, a housing for the valve assembly has to be made compact in accordance with the size of a gas cylinder. Therefore, conventionally, superposed coned disc springs are adapted so as to apply the spring force for valve opening in order that a pressure reducing valve to be provided within the housing can be made compact. The structure of superposed coned disc springs has, in its height direction, one end received by the housing and the other end received by the piston member (for example, Japanese Patent Public Disclosure No. 3-219172).

However, a coned disc spring has a spring constant far larger than that of an coil spring. Therefore, if the coned disc spring is mounted at a height changing due to variation of errors caused when manufacturing the pressure reducing valve chamber and the piston member, the spring force largely changes to result in widely fluctuating a set value of the secondary pressure as well.

In order to keep the secondary pressure within a set range, conventionally it was required to absorb the variation of manufacturing errors by attaching a height adjusting shim at an end of the coned disc spring or exchanging the piston member or the like parts. This took time and labor in assembling the valve assembly.

SUMMARY OF THE INVENTION

Then the present invention has an object to provide a novel assembly for improving the foregoing disadvantage.

In order to accomplish the above-mentioned object, the invention as defined in the claims has constructed a valve assembly for a gas cylinder in the following manner, for example, as shown in FIGS. 1 to 7.

The valve assembly comprises a pressure reducing valve 8 arranged in series with a stop valve 7 between an inlet bore 4 and an outlet bore 5 within a housing 3, a gas charging passage 10 arranged in parallel to the pressure reducing valve 8, a check valve 11 provided in the gas charging passage 10 so as to inhibit gas flow from the inlet bore 4 to the outlet bore 5, and a secondary (downstream) safety valve 28 communicated with the outlet bore 5. The pressure reducing valve 8 is adapted so as to move a piston member 59 for opening and closing by a balance between a spring force for valve opening and a secondary (valve-outlet) pressure for valve closing. A first coned disc spring (F) urges the piston member 59 toward an opening direction. The first coned disc spring (F) is connected in series with a second coned disc spring (S), the second coned disc spring (S) being adjusted so as to be compressible by a pushing member (66).

The invention presents the following function and effect.

Even if there exist manufacturing errors in a pressure reducing valve chamber and the piston member of the pressure reducing valve, the manufacturing errors can be absorbed through varying a compression amount of the second coned disc spring by the pushing member to change a height at which the first coned disc spring is mounted. This can set an urging force of the first coned disc spring for valve opening to a desired value, thereby keeping the secondary pressure of the pressure reducing valve within a desired set range.

Accordingly, differently from the conventional technique, there is no need to attach the height adjusting shim at the end of the first coned disc spring or exchange the piston member or the like parts, which results in a possibility of efficiently assembling the valve assembly.

Besides, as mentioned above, the urging force of the first coned disc spring can be set to a desired value through varying the compression amount of the second coned disc spring. Therefore, it is also possible to adjust the secondary pressure of the pressure reducing valve in a wide range.

Figure 1:
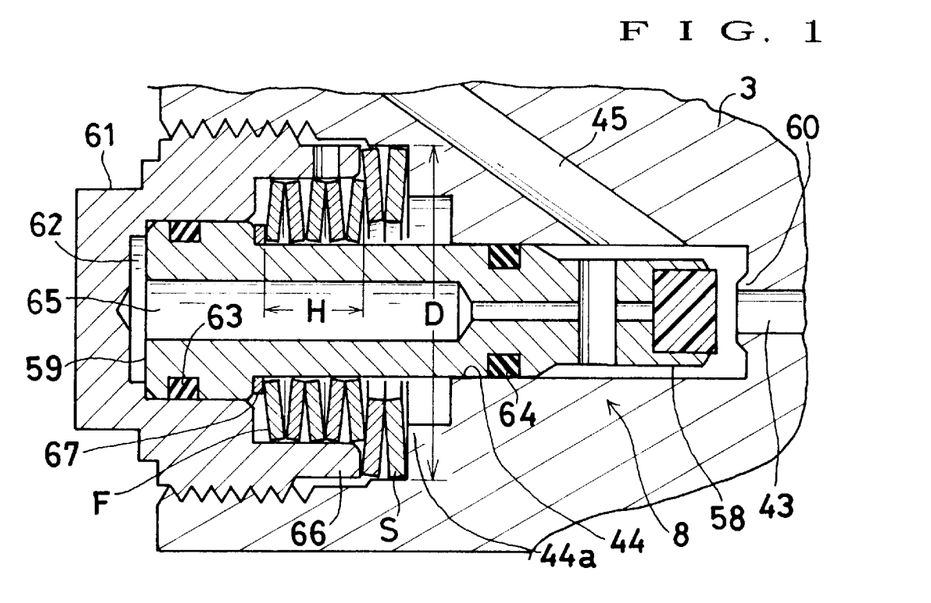
FIG. 1 shows a pressure reducing valve provided in a valve assembly for a gas cylinder and is an enlarged view of a portion indicated by an arrow (I) in FIG. 4.

A pressure reducing valve according to the invention is suitable for being provided in a valve assembly for a gas cylinder. This pressure reducing valve is constructed in the following manner, for example, as shown in FIG. 1.

The pressure reducing valve has a piston member 59 inserted into a pressure reducing valve chamber 44 within a housing 3, the piston member 59 being adapted so as to move for opening and closing by a balance between a spring force for valve opening and a secondary (valve-outlet) pressure for valve closing, the pressure reducing valve comprising a first coned disc spring (F) urging the piston member 59 toward an opening direction, a second coned disc spring (S) connected in series with the first coned disc spring (F), and a pushing member 66 compressing the second coned disc spring (S).

Even if there exist manufacturing errors in the pressure reducing valve chamber and the piston member of the pressure reducing valve, the manufacturing errors can be absorbed through varying a compression amount of the second coned disc spring by the pushing member to change a height at which the first coned disc spring is mounted. This can set an urging force of the first coned disc spring for valve opening to a desired value, thereby keeping the secondary pressure of the pressure reducing valve within a desired set range.

Accordingly, differently from the conventional technique, there is no need to attach the height adjusting shim at the end of the first coned disc spring or exchange the piston member or the like parts, which results in a possibility of efficiently assembling the pressure reducing valve.

Besides, as mentioned above, the urging force of the first coned disc spring can be set to a desired value through varying the compression amount of the second coned disc spring. Therefore, it is also possible to adjust the secondary pressure of the pressure reducing valve in a wide range.

As the invention indicates, in a case where the second coned disc spring is set to a value larger than that of the first coned disc spring in each of an outer diameter and a spring constant, the first coned disc spring is hardly influenced over substantially the entire zone of its compression by an urging force of the second coned disc spring. Consequently, this facilitates to keep the secondary pressure of the pressure reducing valve within a desired set range.

The housing 3 has an external surface opened for providing the pressure reducing valve chamber 44. The valve chamber 44 has an open end brought into screw-thread engagement with a cap member 61 so as to be able to advance and retreat the cap member 61. The cap member 61 has the piston member 59 hermetically inserted thereinto and the pushing member 66 projecting therefrom. The first coned disc spring (F) is mounted in an annular space defined between the pushing member 66 and the piston member 59, and the second coned disc spring (S) is mounted between a projecting end of the pushing member 66 and a peripheral wall 44a of the pressure reducing valve chamber 44.

The invention can mount two kinds of coned disc springs by a simple construction and besides vary a compression amount of the second coned disc spring and that of the first coned disc spring by the pushing member only through screwing the cap member. Therefore, the pressure reducing valve can be made in a simple construction at a low cost.

Furthermore, the invention is an assembly suitable for a valve assembly with a pressure reducing valve provided therein and is constructed in the following manner, for example, as shown in FIGS. 2 to 6.

The assembly comprises a pressure reducing valve 8 arranged in series with a stop valve 7 between an inlet bore 4 and an outlet bore 5 within a housing 3, a gas charging passage 10 arranged in parallel to the pressure reducing valve 8, a check valve 11 provided in the gas charging passage 10 so as to inhibit gas flow from the inlet bore 4 to the outlet bore 5, and a secondary (downstream) safety valve 28 communicated with the outlet bore 5, wherein the outlet bore 5 has an inner peripheral surface 5a provided with a gas introducing inlet 30 of the secondary safety valve 28 and a sealing surface 32 into which a sealing portion 33 of a gas charging mouthpiece 14 is fitted, in order toward an innermost space (A) of the outlet bore 5, and the gas charging mouthpiece 14 is attached to a peripheral wall of the outlet bore 5 to thereby bring the sealing portion 33 into sealing contact with the sealing surface 32 to cut off a communication condition between the innermost space (A) of the outlet bore 5 and the gas introducing inlet 30 and is adapted so as to be able to supply a charging gas present therein to the gas charging passage 10 through the innermost space (A) of the outlet bore 5.

The invention functions in the following manner, for example, as shown in FIGS. 2 to 6.

The stop valve 7 is closed while a gas cylinder 1 is being transported and stored.

At the time of gas taking-out, the stop valve 7 is opened. Then a high pressure gas contained in the gas cylinder 1 enters from the inlet bore 4 and flows out of the outlet bore 5 through the stop valve 7 and the pressure reducing valve 8 in order. During this gas taking-out, in the case where the outlet bore 5 gets an abnormally high pressure because of foreign matters biting the pressure reducing valve 8 and the check valve 11 or for the like reason, the abnormal pressure is relieved from the secondary safety valve 28.

Figure 6:
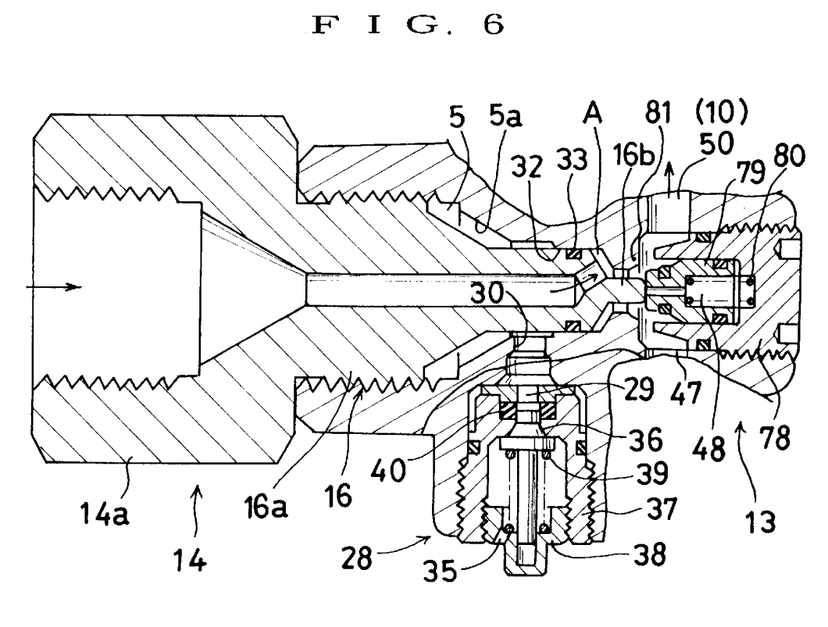
FIG. 6 shows a state where gas is charged into the valve assembly and corresponds to FIG. 5.

When charging a high pressure gas into the emptied gas cylinder 1, first the gas charging mouthpiece 14 is attached to the peripheral wall of the outlet bore 5. Then as shown in FIG. 6, the sealing portion (here an 0-ring) 33 of the gas charging mouthpiece 14 closes the gas introducing inlet 30 of the secondary safety valve 28.

Next, with the stop valve 7 opened, the gas charging mouthpiece 14 supplies the charging gas of high pressure. Then the charging gas is charged from the innermost space (A) of the outlet bore 5 into the gas cylinder 1 through the check valve 11, the stop valve 7 and the inlet bore 4 in order. At this gas charging time, the gas introducing inlet 30 is being closed. Therefore, the high pressure charging gas supplied to the innermost space (A) of the outlet bore 5 does not flow into the secondary safety valve 28 with the result of preventing the charging gas from blowing out of the secondary safety valve 28.

The invention presents the following effect since it is constructed and functions as mentioned above.

At the time of gas charging, when the gas charging mouthpiece is attached to the peripheral wall of the outlet bore of the valve assembly, the sealing portion of the gas charging mouthpiece automatically closes the gas introducing inlet of the secondary safety valve and therefore the high pressure charging gas does not flow into the secondary safety valve. This facilitates the gas charging work.

Besides, in order to accomplish the above effect, it is sufficient only to provide the gas introducing inlet and the sealing surface in the inner peripheral surface of the outlet bore. Thus the valve assembly can be manufactured in a simple construction at a low cost and in addition hardly gets out of order.

BRIEF DESCRIPTION OF THE DRAWINGS

FIGS. 1 to 7 show an embodiment of the present invention;

DESCRIPTION OF THE PREFERRED EMBODIMENT

Hereafter, an embodiment of the present invention is explained with reference to FIGS. 1 to 7.

Figure 2:
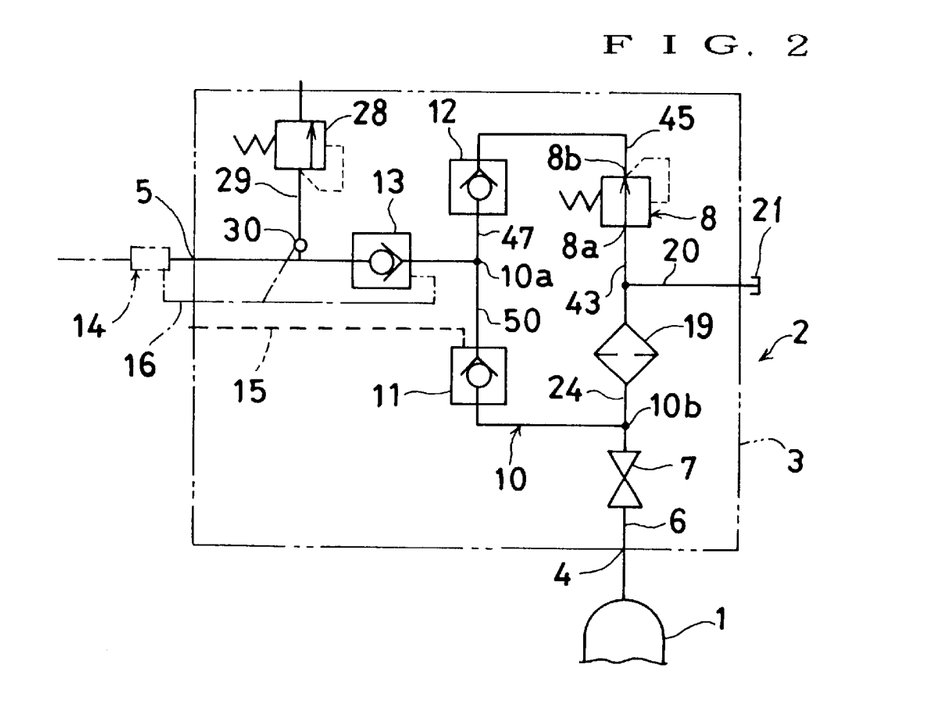
FIG. 2 is a system diagram of the valve assembly.

First, a valve assembly is outlined by resorting to a system diagram of FIG. 2.

A valve assembly 2 fixed to a gas cylinder 1 comprises a housing 3 having an external surface provided with an inlet bore 4 and an outlet bore 5. A stop valve 7 and a pressure reducing valve 8 are arranged in order in a gas taking-out passage 6 extending from the inlet bore 4 to the outlet bore 5.

A gas charging passage 10 is provided in parallel to the pressure reducing valve 8 between the outlet bore 5 and an outlet of the stop valve 7. The gas charging passage 10 is provided with a first check valve 11 preventing gas flow from the outlet of the stop valve 7 to the outlet bore 5. Further, there is provided a second check valve 12 preventing gas flow from the outlet bore 5 to an outlet 8b of the pressure reducing valve 8 between the outlet 8b of the pressure reducing valve 8 and an inlet 10a of the gas charging passage 10. Furthermore, there is provided a third check valve 13 preventing gas flow from the outlet bore 5 to the respective of the check valves 11, 12 between the first and second check valves 11, 12 and the outlet bore 5.

A gas charging mouthpiece 14 is adapted to be connectable to the outlet bore 5. The gas charging mouthpiece 14 is provided with a means 16 for forcedly opening the third check valve 13. Further, the housing 3 is provided with another means 15 for forcedly opening the first check valve 11.

There is provided a primary (upstream) filter 19 for the pressure reducing valve 8 between the outlet of the stop valve 7 and an inlet 8a of the pressure reducing valve 8. A detecting passage 20 branches off from a portion between the filter 19 and the pressure reducing valve 8. The detecting passage 20 has an open end provided with a plug 21, which is adapted to be replaceable by a pressure gage (not shown) so as to be able to detect a primary (valve-inlet) pressure.

Additionally, the outlet bore 5 is communicated with a gas introducing passage 29 of a secondary (downstream) safety valve 28. The gas introducing passage 29 is closed by the forcedly valve opening means 16 of the gas charging mouthpiece 14.

The valve assembly 2 is used as follows. The gas cylinder 1 is charged with a high pressure gas of, for example, about 150 to 300 kgf/cm² (about 15 to 30 MPa) which is a pressure not less than the conventional charging pressure [of about 150 Kgf/cm² (about 15 MPa)].

At the time of gas taking-out, the stop valve 7 is opened to reduce the high pressure gas within the gas cylinder 1 by the pressure reducing valve 8 to a predetermined pressure. Thereafter, the reduced gas is taken out of the outlet bore 5 through the second check valve 12 and the third check valve 13 in order.

During this gas taking-out, in the case where the outlet bore 5 gets an abnormally high pressure because of foreign matters biting the first check valve 11 or the pressure reducing valve 8 or for the like reason, the abnormal pressure is relieved from the secondary safety valve 28.

During the above gas taking-out, should a reversely flowing gas invade the outlet bore 5 for some reason, the third check valve 13 inhibits the reverse flow to prevent an internal area of the gas cylinder 1 from being polluted by the reversely flowing gas.

When the gas is continuously taken out until a residual pressure of the gas cylinder 1 lowers to a set pressure, the second check valve 12 is automatically closed by a spring (not shown) and at the same time the third check valve 13 is automatically closed by a spring (not shown) as well. This prevents the gas from being further taken out to keep the residual pressure of the gas cylinder 1 at the set pressure. As a result, even if the stop valve 7 is kept open by mistake, it is possible to prohibit the atmosphere from invading the emptied gas cylinder 1.

When charging a high pressure gas into the emptied gas cylinder 1, first the gas charging mouthpiece 14 is connected to the outlet bore 5. Then the forcedly valve opening means 16 provided in the mouthpiece 14 is operated manually (or by the pressure of the charging gas) to open the third check valve 13. Simultaneously with the connection of the mouthpiece 14, a gas introducing inlet 30 of the secondary safety valve 28 is closed by the means 16.

Next, with the stop valve 7 kept open, the gas charging mouthpiece 14 supplies the high pressure charging gas. Then the charging gas is charged from the outlet bore 5 into the gas cylinder 1 through the third check valve 13, the first check valve 11, the stop valve 7 and the inlet bore 4 in order.

At this gas charging time, the gas introducing inlet 30 is closed to thereby prevent the high pressure charging gas supplied to the outlet bore 5 from flowing into the secondary safety valve 28. This can prohibit the charging gas from blowing out of the secondary safety valve 28.

When evacuating the gas cylinder 1 prior to the gas charging, it is sufficient if the third check valve 13 and the stop valve 7 are opened and at the same time the first check valve 11 is opened by the forcedly valve opening means 15.

In the event that the gas within the gas cylinder 1 is taken out with its high pressure maintained, it is satisfactory if the first check valve 11 is opened by the forcedly valve opening means 15 and the stop valve 7 is opened. Then the high pressure gas within the gas cylinder 1 is taken out of the outlet bore 5 through the stop valve 7, the first check valve 11 and the third check valve 13.

Figure 3:
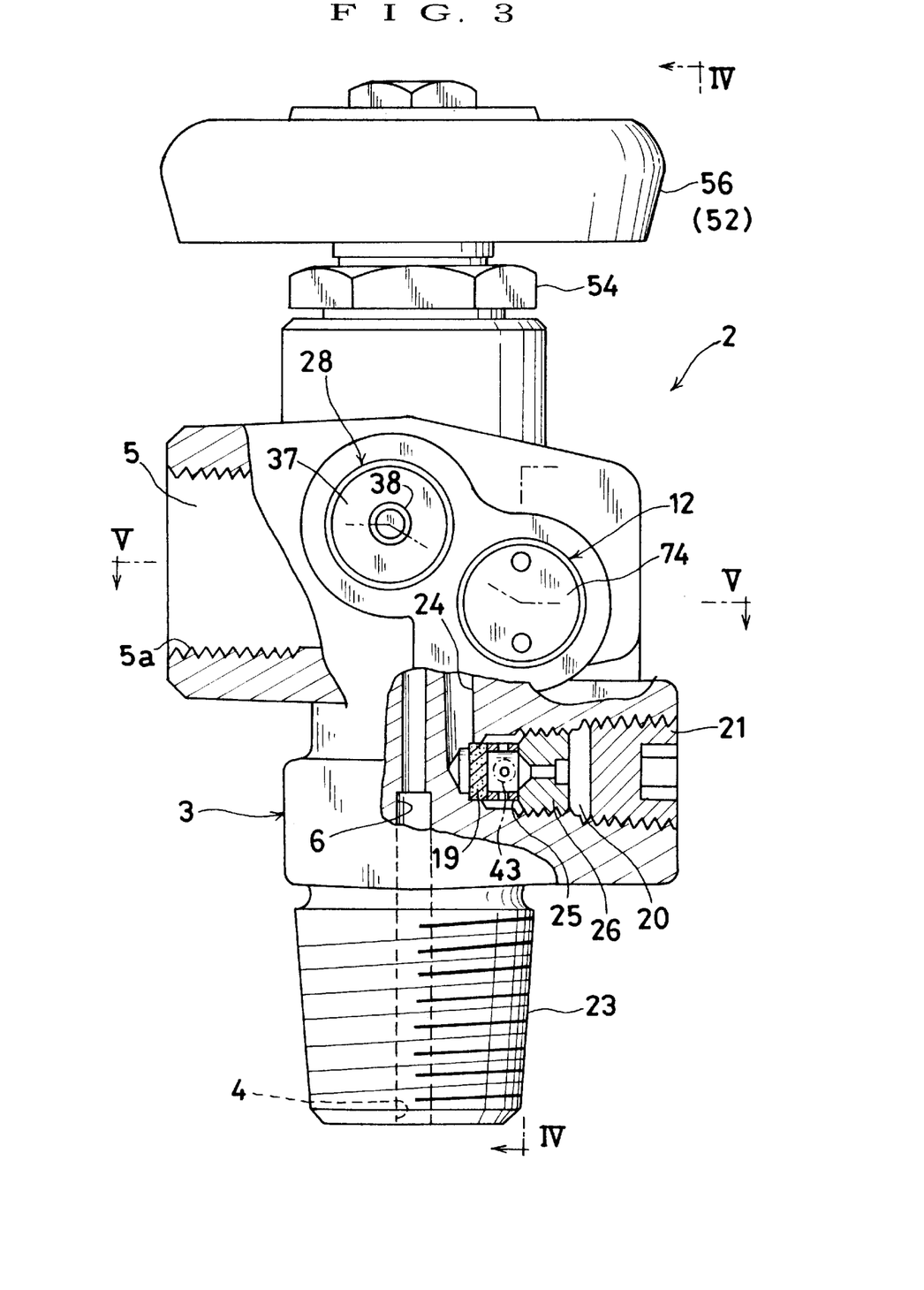
FIG. 3 is a partial sectional view of the valve assembly when seen in elevation.
Figure 4:
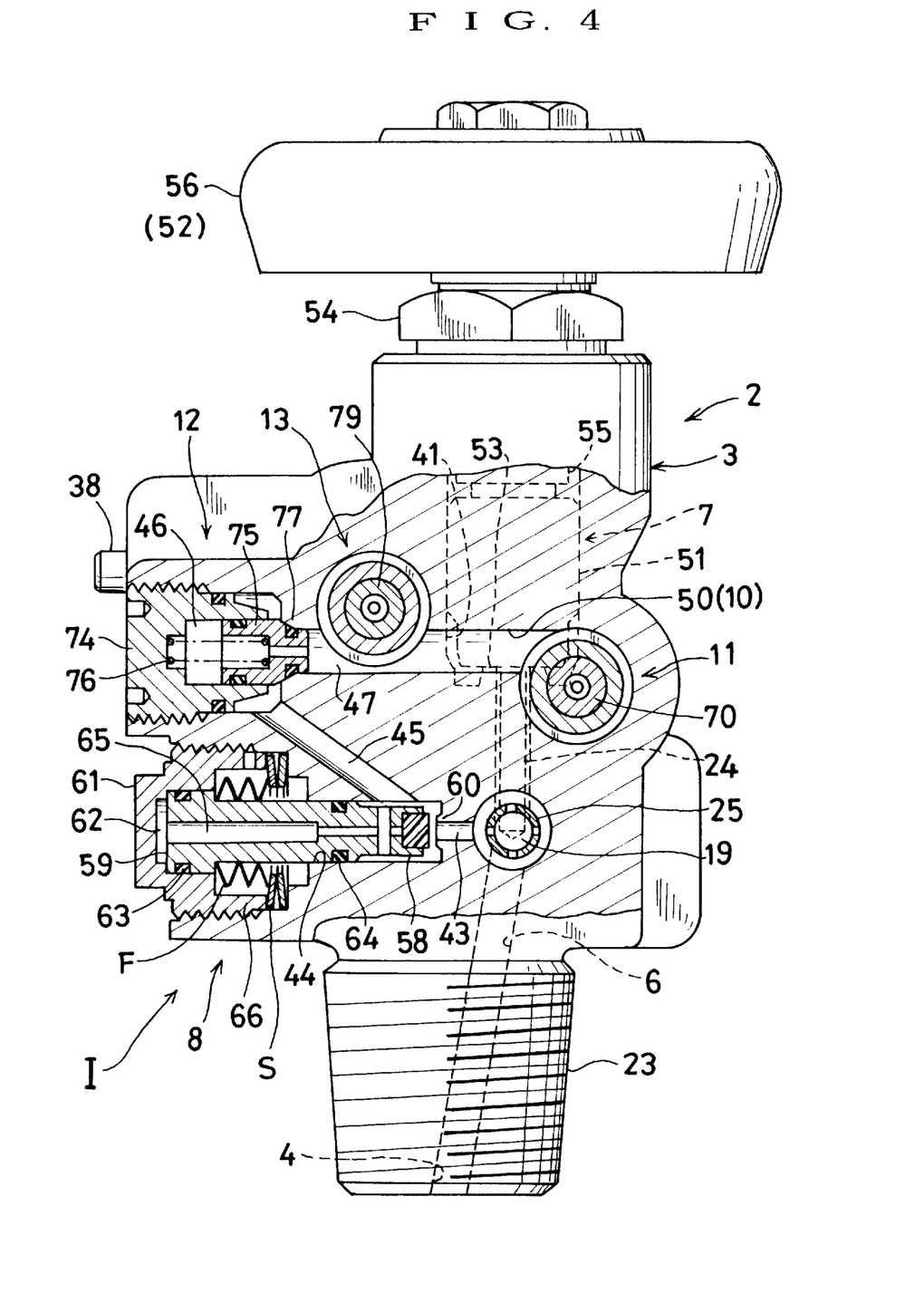
FIG. 4 is a sectional view when seen along a line IV—IV in a direction indicated by arrows in FIG. 3.
Figure 5:
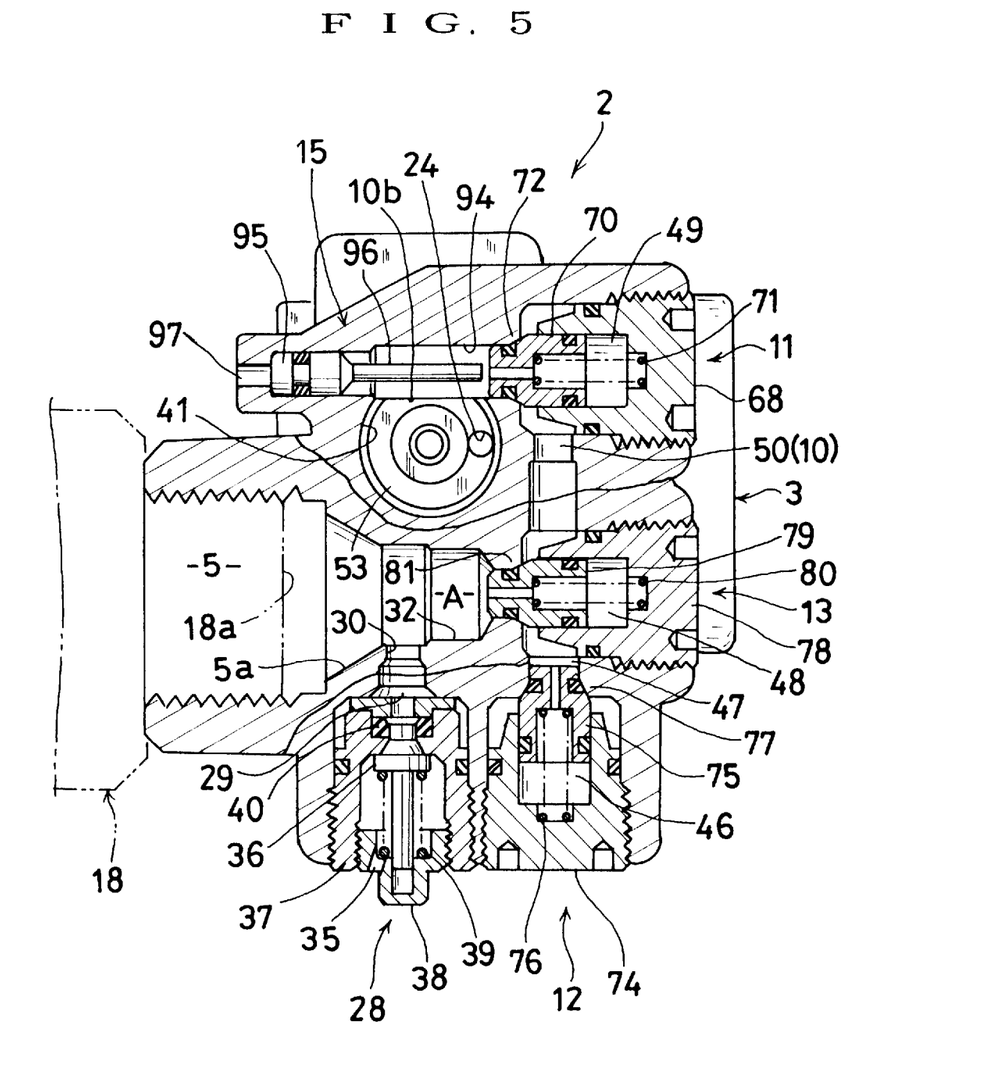
FIG. 5 is a sectional view when seen along a line V—V in a direction indicated by arrows in FIG. 3.

A concrete structure of the valve assembly 2 is explained by relying on FIGS. 3 to 6 with reference to the system diagram of FIG. 2. FIG. 3 is a partial sectional view of the valve assembly when seen in elevation. FIG. 4 is a sectional view when seen along a line IV—IV in a direction indicated by arrows in FIG. 3. FIG. 5 is a sectional view when seen along a line V—V in a direction indicated by arrows in FIG. 3. FIG. 6 is a partial view showing a state where gas is charged and corresponds to FIG. 5.

The housing 3 has a threaded leg portion 23 provided with the inlet bore 4 at its under surface and a mid-height portion horizontally provided with the outlet bore 5. The inlet bore 4 is connected to the outlet bore 5 through a stop valve seat 53, a stop valve chamber 41, a filter inlet passage 24, the filter 19, a pressure reducing inlet passage 43, a pressure reducing valve chamber 44, a pressure reducing outlet passage 45, a second check valve seat 77, an inlet passage 47 for the third check valve 13 and a third check valve seat 81 in order. As shown in FIG. 3, the filter 19 is fixed by an adapter cylinder 25 and an externally threaded cylinder 26. The externally threaded cylinder 26 has a downstream side sealed by the plug 21.

The inlet passage 47 is communicated with the stop valve chamber 41 through the gas charging passage 10, which has a midway portion provided with the first check valve 11. Numeral 50 designates an inlet passage for the first check valve 11.

The stop valve 7 comprises a closure member 51 inserted vertically movably into the stop valve chamber 41, the closure member 51 being adapted to open and close with respect to the stop valve seat 53 by an opening and closing means 52. More specifically, the closure member 51 engaged with the stop valve chamber 41 in screw-thread fashion is vertically moved through rotating a valve spindle 55 supported by a gland cover 54 with a handle 56 to thereby contact a valve face portion provided at a lower portion of the closure member 51 with the stop valve seat 53 or separate it therefrom.

The pressure reducing valve 8 is explained principally by resorting to FIG. 1. FIG. 1 is an enlarged view of a portion indicated by an arrow (I) in FIG. 4.

The pressure reducing valve chamber 44 has a right portion into which a pressure reducing member 58 is inserted. The pressure reducing member 58 is adapted to open and close with respect to a pressure reducing valve seat 60 by a piston member 59. More specifically, the housing 3 has the external surface horizontally opened for providing the pressure reducing valve chamber 44, which has an open portion engaged with a bolted cap member 61 in screw-thread fashion so as to be able to advance and retreat the cap member 61. A left portion of the piston member 59 is hermetically inserted into the cap member 61 by a first sealing member 63 and a right portion of the piston member 59 is also hermetically inserted into a right portion of the pressure reducing valve chamber 44 by a second sealing member 64. An actuation chamber 62 on a left side of the piston member 59 is communicated with the pressure reducing outlet passage 45 through a gas introducing passage 65 and the right portion of the pressure reducing valve chamber 44.

An annular pushing member 66 projects from the cap member 61. A plurality of first coned disc springs (F) are attached in an annular space defined between the pushing member 66 and the piston member 59. Two second coned disc springs (S) are attached between a projecting end of the pushing member 66 and a stepped portion of a peripheral wall 44a of the pressure reducing valve chamber 44. The second coned disc springs (S) are connected to the first coned disc springs (F) in series and directly. The second coned disc spring (S) is set to a value larger than that of the first coned disc spring (F) in each of an outer diameter (D) and a spring constant. Numeral 67 designates a spring retainer, which can be omitted.

The piston member 59 is pushed toward a right valve closing direction by a difference force between gas pressures acting on both the sealing members 63 and 64. And the pressure reducing member 58 opens and closes with respect to the pressure reducing valve seat 60 by a balance between a valve opening force exerted by the first coned disc springs (F) and a valve closing force put out by the gas pressure force.

And the pushing member 66 varies a compression amount of the second coned disc springs (S) through advancing or retreating the cap member 61 in accordance with the screw-thread fitting engagement, thereby changing an attaching height (H) of the first coned disc springs (F) to adjust an urging force of the first coned disc springs (F).

Figure 7:
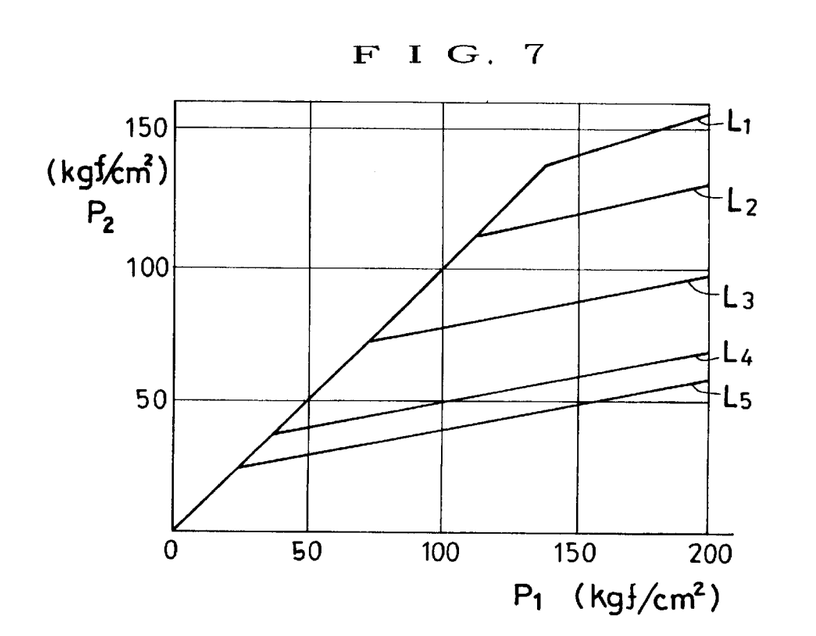
FIG. 7 is a view showing a relationship between primary pressures of the pressure reducing valve and secondary pressures thereof.

FIG. 7 shows an example of a test result of the pressure reducing valve 8.

In FIG. 7 respective curves $L_1$ to $L_5$ indicate varying characteristics of secondary pressures $P_2$ of the pressure reducing valve 8 in proportion to primary pressures $P_1$ thereof.

In the case of the characteristic curve $L_1$, the amount of the second coned disc springs (S) to be compressed by the pushing member (66) is set to minimum, thereby making the attaching height (H) of the first coned disc springs (F) in FIG. 1 minimum and the urging force thereof maximum. Further, in the case of the characteristic curve $L_5$ when compared with the case of the characteristic curve $L_1$, the cap member 61 is screwed by about half turn to maximize the compression amount of the second coned disc springs (S), thereby making the attaching height (H) of the first coned disc springs (F) maximum and the urging force thereof minimum.

When making a comparison with the characteristic curve $L_1$ taken as a reference, the second coned disc springs (S) are compressed in extra amount of about 0.20 mm in $L_2$, about 0.43 mm in $L_3$, about 0.67 mm in $L_4$ and about 0.73 mm in $L_5$, respectively.

The first check valve 11 comprises a first checking member 70 inserted into a first check valve chamber 49 within a cover bolt 68, the checking member 70 being brought into closing contact with a first check valve seat 72 by an inner pressure of the first check valve chamber 49 and a first checking spring 71. The second check valve 12 also comprises a second checking member 75 inserted into a second check valve chamber 46 within a cover bolt 74, the second checking member 75 being brought into closing contact with the second check valve seat 77 by an inner pressure of the second check valve chamber 46 and a second checking spring 76. Further, the third check valve 13 comprises a third checking member 79 inserted into a third check valve chamber 48 as well, the third checking member 79 being brought into closing contact with the third check valve seat 81 by an inner pressure of the third check valve chamber 48 and a third checking spring 80.

The gas introducing passage 29 of the secondary safety valve 28 has one end provided with the gas introducing inlet 30 opened toward an innermost portion of an inner peripheral surface 5a of the outlet bore 5 and the other end communicated with an exterior space of the housing 3 through a blowout hole 35. The secondary safety valve 28 comprises a piston portion 36 arranged within a cover bolt 37, the piston portion 36 being brought into closing contact with a safety valve seat 40 made of an O-ring by a safety spring 39. Numeral 38 indicates a spring retainer.

As shown in FIG. 6 (or FIG. 5), the inner peripheral surface 5a of the outlet bore 5 has the gas introducing inlet 30 of the secondary safety valve 28 and a sealing surface 32 arranged in order toward an innermost space (A) of the outlet bore 5. The gas charging mouthpiece 14 comprises a cylindrical mouthpiece main body 14a and the forcedly valve opening means 16.

The forcedly valve opening means 16 has an externally threaded portion 16a, which is screwed into the peripheral wall of the outlet bore 5 to thereby hermetically bring an O-ring (sealing member) 33 attached to a projecting portion of the externally threaded portion 16a into sealing contact with the sealing surface 32. Thus the O-ring 33 cuts off a communication condition between the innermost space (A) of the outlet bore 5 and the gas introducing inlet 30. At the same time, a valve opening member 16b provided at a front end of the means 16 separates the third checking member 79 of the third check valve 13 from the third check valve seat 81.

The forcedly valve opening means 15 for the first check valve 11 comprises a cylinder bore 94 arranged in series with the first check valve chamber 49 and the first check valve seat 72, and a piston 95 hermetically inserted into the cylinder bore 94 as shown in FIG. 5. The cylinder bore 94 crosses the stop valve chamber 41 and the thus resulting cross portion forms a gas charging passage outlet 10b. The piston 95 projects toward its one end a piston rod 96 facing the first checking member 70 and has the other end surface opposed to the exterior space of the housing 3 through a communication hole 97 provided on the other end side of the cylinder bore 94.

The valve assembly 2 operates as follows.

When taking a gas out of the gas cylinder 1, an externally threaded portion 18a of a gas taking-out mouthpiece 18 is hermetically connected to the peripheral wall of the outlet bore 5 (see FIG. 5). The closure member 51 of the stop valve 7 is opened by the handle 56.

Then the gas within the gas cylinder 1 passes through the inlet bore 4, the stop valve seat 53, the stop valve chamber 41, the filter 19 and the pressure reducing inlet passage 43 in order and pushes the pressure reducing member 58 for opening it to flow from the pressure reducing valve chamber 44 into the pressure reducing outlet passage 45. The thus flowed-in gas separates the second checking member 75 from the second check valve seat 77 against the second checking spring 76 with its pressure and flows into the inlet passage 47 for the third check valve 13. This gas separates the third checking member 79 from the third check valve seat 81 against the third checking spring 80 with its pressure to be taken out of the mouthpiece 18 through the outlet bore-5.

And in the case where for some reason the outlet bore 5 gets an abnormally high pressure, the abnormal pressure separates the piston portion 36 of the secondary safety valve 28 from the safety valve seat 40.

In this gas taking-out state, the first checking member 70 is brought into closing contact with the first check valve seat 72 by a force resultant from an inner pressure of the first check valve chamber 49 and a resilient force of the first checking spring 71. Further, when a reversely flowing gas has entered into the outlet bore 5 for some reason during the gas taking-out, the pressure of the reversely flowing gas introduced into the third check valve chamber 48 acts on the third checking member 79 as a valve closing force in addition to a valve closing force of the third checking spring 80 to thereby bring the third checking member 79 into closing contact with the third check valve seat 81.

When the gas is continuously taken out until the residual pressure of the gas cylinder 1 lowers to the set pressure, a valve closing force of the second checking spring 76 overcomes a valve opening force resulting from the pressure of the gas in the pressure reducing outlet passage 45 to thereby bring the second checking member 75 into closing contact with the second check valve seat 77. At the same time, the valve closing force of the third checking spring 80 overcomes a valve opening force resulting from the pressure of the gas in the inlet passage 47 for the third check valve 13 to thereby bring the third checking member 79 into closing contact with the third check valve seat 81. Thus the residual pressure of the gas cylinder 1 is kept at the set pressure.

When charging a high pressure gas into the emptied gas cylinder 1, as shown in FIG. 6, the gas charging mouthpiece 14 is connected to the peripheral wall of the outlet bore 5. Then the O-ring 33 provided in the mouthpiece 14 seals the sealing surface 32 and the valve opening member 16*b* separates the third checking member 79 from the third check valve seat 81. In this state, the closure member 51 of the stop valve 7 is opened and the high pressure gas is supplied to the gas charging mouthpiece 14. Then the high pressure gas passes through the innermost space (A) of the outlet bore 5 and the third check valve seat 81 and flows into the inlet passage 50 for the first check valve 11. This gas pushes and opens the first checking member 70 with its pressure and flows into the stop valve chamber 41, from which the high pressure gas is charged into the gas cylinder 1 through the inlet bore 4.

During the above-mentioned gas charging, the second checking member 75 is brought into closing contact with the second check valve seat 77 by a force resultant from the second checking spring 76 and the pressure of the high pressure gas introduced from the inlet passage 47 into the second check valve chamber 46.

Thus it is possible to inhibit a fresh high pressure gas from flowing into an outlet side of the pressure reducing valve 8 and therefore omit the filter from the outlet side, which results in a possibility of simplifying the valve assembly 2. Further, the high pressure gas supplied to the stop valve chamber 41 during the gas charging is reduced to have a low pressure while it is flowing from the pressure reducing inlet passage 43 to the pressure reducing valve chamber 44 and then flowed into the actuation chamber 62. Therefore, the actuation chamber 62 exerts a small valve closing force to act on the piston member 59. As a result, it is possible to prevent the pressure reducing member 58 and the pressure reducing valve seat 60 from being damaged due to plastic deformation and therefore lengthen the life span of the pressure reducing valve 8.

In the case of evacuating the gas cylinder 1 prior to the gas charging, the valve assembly 2 is operated as follows.

First, an evacuating actuation member (not shown) is inserted into the cylinder bore 94 through the communication hole 97. The actuation member separates the first checking member 70 from the first check valve seat 72 through the piston 95 and the piston rod 96. In this state, the third checking member 79 and the closure member 51 are opened to evacuate the gas cylinder 1 through the gas charging mouthpiece 14. Then the residual gas within the gas cylinder 1 is sucked into the exterior area through the inlet bore 4, the stop valve chamber 41, an internal area of the first check valve seat 72, an internal area of the third check valve seat 81 and the outlet bore 5.

As shown in FIGS. 4 and 5, the three check valves 11, 12 and 13 are arranged at a position opposite to the outlet bore 5 and side by side in a direction perpendicular to an axis of the outlet bore 5 and at the same time the secondary safety valve 28 is disposed on an upper side of the pressure reducing valve 8. Thus the valve assembly 2 can be made compact and accommodated within an existing protector cap (not shown). Besides, the three check valves 11, 12 and 13 are each constructed in the same shape and therefore can make their parts common, which entails a possibility of manufacturing the valve assembly 2 at a low cost.

The foregoing embodiment can be modified as follows.

It is a matter of course that the number of the first coned disc springs (F) to be superposed is not limited to five as illustrated. Further, the number of the second coned disc springs (S) may be one or at least three instead of two as illustrated.

The first coned disc springs (F) may be connected to the second coned disc springs (S) with a spring retainer interposed therebetween instead of directly.

Each of the coned disc springs (F) and (S) may be superposed by facing it in the same direction instead of by alternately changing its direction of facing. Moreover, the alternate facing may be combined with the identical facing, which makes it possible to select an urging force having various ranges.

The three check valves 11, 12 and 13 may be made in different shapes or different acting types instead of in the same shape. The respective check valves 11, 12 and 13 may be omitted depending on the usage of the gas cylinder.

What is claimed is:

1. A pressure reducing valve including a piston member (59) inserted into a pressure reducing valve chamber (44) within a housing (3), the piston member (59) being adapted to move for opening and closing by a balance between a spring force for valve opening and a secondary pressure for valve closing, the pressure reducing valve comprising:

a first coned disc spring (F) urging the piston member (59) toward an opening direction;

a second coned disc spring (S) connected in series with the first coned disc spring (F); and a pushing member (66) arranged to variably compress the second coned disc (S) and thereby adjust the valve opening force of the first coned disc spring.

2. A pressure reducing valve as set forth in claim 1, wherein the second coned disc spring (S) is set to a value larger than that of the first coned disc spring (F) in each of an outer diameter (D) and a spring constant.

3. A pressure reducing valve as set forth in claim 2, wherein the pressure reducing valve chamber (44) has an open end and a peripheral wall (44a), the pressure reducing valve chamber (44) being provided by opening an external surface of the housing (3), a cap member (61) being brought into screw-thread engagement with the open end of the pressure reducing valve chamber (44), the piston member (59) being hermetically inserted into the cap member (61), and the pushing member (66) has a projecting end and projects from the cap member (61), the first coned disc spring (F) being mounted in an annular space defined between the pushing member (66) and the piston member (59), the second coned disc spring (S) being mounted between the projecting end of the pushing member (66) and the peripheral wall (44a) of the pressure reducing valve chamber (44).

* * * * *